United States Patent
Takeda et al.

(10) Patent No.: US 9,820,249 B2
(45) Date of Patent: Nov. 14, 2017

(54) RADIO BASE STATIONS AND USER TERMINAL FOR SYNCHRONIZATION IN AN ASYNCHRONOUS NETWORK

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Shimpei Yasukawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 14/906,053

(22) PCT Filed: Jul. 8, 2014

(86) PCT No.: PCT/JP2014/068218
§ 371 (c)(1),
(2) Date: Jan. 19, 2016

(87) PCT Pub. No.: WO2015/012102
PCT Pub. Date: Jan. 29, 2015

(65) Prior Publication Data
US 2016/0157197 A1    Jun. 2, 2016

(30) Foreign Application Priority Data
Jul. 23, 2013 (JP) ................. 2013-152670

(51) Int. Cl.
*H04B 7/00* (2006.01)
*H04W 56/00* (2009.01)
*H04W 16/32* (2009.01)

(52) U.S. Cl.
CPC ......... *H04W 56/002* (2013.01); *H04W 16/32* (2013.01)

(58) Field of Classification Search
CPC ..... H04W 16/32; H04W 24/02; H04W 24/04; H04W 56/0015; H04W 56/002
(Continued)

(56) References Cited

U.S. PATENT DOCUMENTS 8,379,626 B2 * 2/2013 Usami ................. H04W 48/16
370/350
9,386,549 B2 * 7/2016 Lin .................. H04W 56/0015
(Continued)

FOREIGN PATENT DOCUMENTS

WO    2011043413 A1    4/2011
WO    2011097770 A1    8/2011

OTHER PUBLICATIONS

International Search Report issued in PCT/JP2014/068218 dated Oct. 14, 2014 (4 pages).
(Continued)

*Primary Examiner* — Dmitry H Levitan
(74) *Attorney, Agent, or Firm* — Osha Liang LLP

(57) ABSTRACT

The present invention is designed to establish synchronization properly even when synchronizing between different cells by means of a radio interface in an asynchronous NW. A radio base station establishes radio synchronization by using downlink signals transmitted from the radio base station of other cells, and has a synchronization information control section that, via an inter-base station interface, reports a synchronization information request to the radio base stations of other cells and also acquires synchronization information reported from the radio base stations of other cells, and a determining section that determines a radio base station to establish radio synchronization with, based on the synchronization information acquired, and the synchronization information which the synchronization information control section acquires from the radio base stations of other cells includes the synchronization status, the synchroniza-
(Continued)

| IE/GROUP NAME | PRESENCE | RANGE | IE TYPE AND REFERENCE | SEMANTICS DESCRIPTION |
|---|---|---|---|---|
| Synchronization Info | | | | |
| >Stratum Level | M | | INTEGER (0..3, ...) | |
| >Synchronization status | M | | ENUMERATED (Synchronous, Asynchronous, ...) | | tion stratum levels, and information to represent the synchronization groups, of the radio base stations of other cells.

10 Claims, 17 Drawing Sheets

(58) Field of Classification Search
USPC .................................. 370/310, 328, 350, 432
See application file for complete search history.

(56) References Cited

U.S. PATENT DOCUMENTS

| | | | |
|---|---|---|---|
| 2010/0054237 A1* | 3/2010 | Han | H04J 3/0638 370/350 |
| 2010/0074180 A1* | 3/2010 | Palanki | H04W 56/0015 370/328 |
| 2012/0184311 A1 | 7/2012 | Yamamoto et al. | |
| 2013/0010668 A1 | 1/2013 | Lin et al. | |
| 2013/0122917 A1* | 5/2013 | Yavuz | H04J 3/0638 455/450 |
| 2015/0319723 A1* | 11/2015 | Korhonen | H04W 56/001 370/350 |

OTHER PUBLICATIONS

3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

3GPP TR 36.814 V1.7.2; "3rd Generation Partnership Project; Technical Specification Group Radio Access Network; Further Advancements for E-UTRA Physical Layer Aspects (Release 9)"; Feb. 2010 (102 pages).

European Search Report issued in corresponding European Application No. 14829722.9, dated Feb. 17, 2017 (9 pages).

Office Action issued in the counterpart Japanese Patent Application No. 2013-152670, dated May 16, 2017 (12 pages).

* cited by examiner

| IE/GROUP NAME | PRESENCE | RANGE | IE TYPE AND REFERENCE | SEMANTICS DESCRIPTION |
|---|---|---|---|---|
| Synchronization Info | | | | |
| >Stratum Level | M | | INTEGER (0..3, ...) | |
| >Synchronization status | M | | ENUMERATED (Synchronous, Asynchronous, ....) | |

STRATUM LV. = 0 (e.g., GPS SYNCHRONIZED)

STRATUM LV. = 1 (SYNCHRONIZED w/ LV = 0)

STRATUM LV. = 2 (SYNCHRONIZED w/ LV = 1)

RADIO BASE STATIONS AND USER TERMINAL FOR SYNCHRONIZATION IN AN ASYNCHRONOUS NETWORK

TECHNICAL FIELD

The present invention relates to a radio base station, a user terminal and a radio communication method in a next-generation mobile communication system.

BACKGROUND ART

In a UMTS (Universal Mobile Telecommunications System) network, the specifications of long-term evolution (LTE) have been drafted for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single-Carrier Frequency Division Multiple Access) is used in uplink channels (uplink).

Also, successor systems of LTE (referred to as, for example, "LTE-advanced" or "LTE enhancement" (hereinafter referred to as "LTE-A")) have been under study for the purpose of achieving further broadbandization and increased speed beyond LTE. In the LTE-A system, a HetNet (Heterogeneous Network), in which small cells (for example, pico cells, femto cells and so on), each having a local coverage area of a radius of approximately several tens of meters, are formed inside a macro cell having a wide coverage area of a radius of approximately several kilometers, is under study (see, for example, non-patent literature 2). Also, in relationship to the HetNet, a study is in progress to use carriers of different frequency bands between the macro cell and the small cells.

CITATION LIST

Non-Patent Literature

Non-Patent Literature 1: 3GPP TS 36.300 "Evolved UTRA and Evolved UTRAN Overall Description"
Non-Patent Literature 2: 3GPP TR 36.814 "E-UTRA Further Advancements for E-UTRA Physical Layer Aspects"

SUMMARY OF INVENTION

Technical Problem

In the above HetNet, many small cells may be placed in the macro cell. In this case, a structure may be employed in which small cells are placed in a localized manner in places where the traffic is heavy, so as to achieve an off-loading effect between the cells. That is, if a user terminal can connect with a plurality of small cells, it may be possible to change the small cell with which the user terminal connects, depending on the conditions of traffic in each small cell and so on.

Also, when many small cells are placed in a macro cell, it is preferable to establish time-synchronization between each small cell. By allowing each small cell to time-synchronize with one another, it becomes possible to adequately control the interference between the small cells, allow a user terminal to efficiently discover the connecting small cell, and so on.

As a method of time synchronization between different cells (radio base stations), there is a synchronization method to detect time based on downlink (DL) signals transmitted from other cells (synchronization by a radio interface). For example, a small cell that is going to synchronize anew acquires radio synchronization by using a DL signal transmitted from a macro cell that is synchronized with GPS and so on, or from a small cell that is synchronized with that macro cell.

Meanwhile, in a small cell that is placed in a macro cell's cell edge and so on, cases might occur where DL signals are received not only from the serving macro cell, but also from small cells that belong to the same macro cell, neighboring macro cells, and small cells that belong to the neighboring macro cells. Also, cases might also occur where neighboring macro cells (macro base stations) operate without synchronizing with each other (for example, the asynchronous network (NW) in FDD).

When synchronizing between radio base stations by means of a radio interface in an asynchronous NW, how to determine each small cell's synchronization-target (synchronizing) cell poses a problem. Also, there is also a threat that a macro base station is unable to keep track of the serving small cells' synchronizing NWs.

The present invention has been made in view of the above, and it is therefore an object of the present invention to provide a radio base station, a user terminal and a radio communication method, whereby synchronization can be established properly even when synchronizing between different cells by means of a radio interface in an asynchronous NW.

Advantageous Effects of Invention

A radio base station, according to the present invention, is a radio base station that establishes radio synchronization by using a downlink signal transmitted from a radio base station of another cell, and that has a synchronization information control section that, via an inter-base station interface, reports a synchronization information request to the radio base station of the other cell and also acquires synchronization information reported from the radio base station of the other cell, and a determining section that determines a radio base station to establish radio synchronization with, based on the synchronization information acquired, and the synchronization information which the synchronization information control section acquires from the radio base station of the other cell includes a synchronization status, a synchronization stratum level, and information to represent a synchronization group, of the radio base station of the other cell.

Advantageous Effects of Invention

According to the present invention, it is possible to establish synchronization properly even when synchronizing between different cells by means of a radio interface in an asynchronous NW.

BRIEF DESCRIPTION OF DRAWINGS

FIG. 7 provides diagrams to explain a structure to make reference to UL signals when selecting a NW (macro base station) to synchronize with;

DESCRIPTION OF EMBODIMENTS

Figure 1:
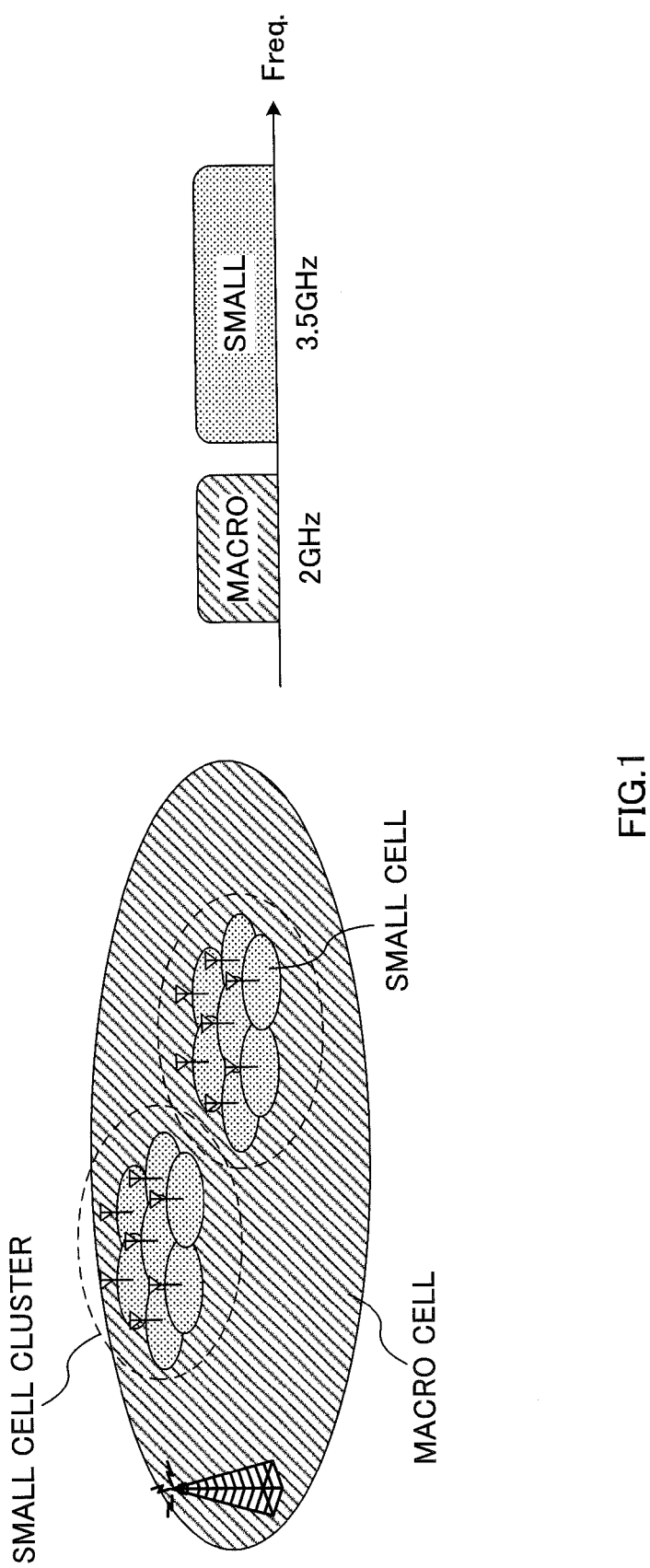
FIG. 1 is a conceptual diagram of a HetNet.

FIG. 1 is a conceptual diagram of a HetNet that is anticipated in Rel. 12 and later versions. As shown in FIG. 1, a HetNet refers to a radio communication system in which macro cells and small cells are arranged to geographically overlap each other at least in part. A HetNet is comprised of a radio base station that forms a macro cell (hereinafter referred to as "macro base station"), radio base stations that form small cells (hereinafter referred to as "small base stations"), and user terminals that communicate with the macro base station and the small base stations.

Generally speaking, the distribution of users and traffic are not fixed, but change over time or between locations. Consequently, when many small cells are placed in a macro cell, the small cells may be placed in such a manner that their density and environment vary (sparse and dense) between locations, as shown in FIG. 1. For example, it may be possible to raise the density of placing small cells (dense small cells) in train stations, shopping malls and so on where many user terminals gather, and lower the density of placing small cells (sparse small cells) in places where user terminals do not gather.

For example, by placing small cells densely and in a localized manner (in clusters) in places where the traffic is heavy, it is possible to achieve an off-loading effect between the cells. Furthermore, since it is not necessary to cover the whole area (the macro cell's coverage area) with the small cells, it becomes possible to control the locations to place the small cells and the number of small cells, taking into account the cost and so on.

The HetNet shown in FIG. 1 illustrates a case where the macro cell uses a carrier of a relatively low frequency band such as 800 MHz and 2 GHz (in FIG. 1, 2 GHz) (hereinafter referred to as the "low frequency band carrier"). The use of the low frequency band carrier allows the macro cell to assume a wide coverage easily, and operate in frequencies that allow connection to existing user terminals (Rel. 8 to 11). By this means, the macro cell can cover a wide range area as a cell where all user terminals stay connected at all times.

Meanwhile, a case is shown here where a plurality of small cells use a carrier of a relatively high frequency band such as, for example, 3.5 GHz (hereinafter referred to as the "high frequency band carrier"). The use of the high frequency band carrier allows the small cells to use a wide band, so that highly efficient data off-loading in a best-effort model becomes possible. Consequently, the small cells are placed in a localized manner as off-loading cells for the user terminals of heavy-traffic areas.

Also, in the HetNet shown in FIG. 1, the connection between the macro cell (macro base station) and the small cells (small base station) is established via a backhaul link. To be more specific, operation is assumed here where the macro base station and the small base stations coordinate via backhaul, and the macro base station assists the small base stations (operation in which the small base stations are dependent on the macro base station). In the operation in which a macro base station assists small base stations, the macro base station reports small base station detection information or control information to user terminals, the macro base station applies carrier aggregation (in the event different frequencies are used) to add the small cells of small base stations or coordinated multi-point communication (in the event the same frequency is used) to the terminals connected to the macro cell.

Also, between a plurality of small base stations, too, connection may be established via a backhaul link. The connection between the macro base station and the small base stations or the connection between the small base stations may be established with wire connection using optical fiber, non-optical fiber (X2 interface) and so on.

As shown in above FIG. 1, in a structure to place many small cells in a macro cell, it is preferable to establish time synchronization (hereinafter also referred to as simply "synchronization") between each small base station. By synchronizing each small base station mutually, it becomes possible to execute interference control between the small cells, or allow user terminals to detect (discover) small base stations adequately.

Figure 2A:
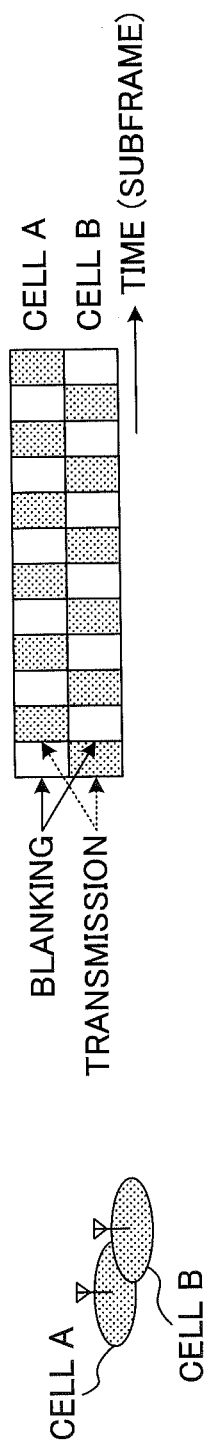
FIG. 2 provides diagrams to explain examples of radio communication control where time synchronization is established between different cells (radio base stations)

For example, when a plurality of small cells (here, cell A and cell B) are arranged unevenly and in a high density, there is a threat that the interference between the cells increases. In this case, by synchronizing between the cells (radio base stations), it becomes possible to reduce interference by means of inter-cell interference control, coordinated communication and so on (see FIG. 2A). In particular, when TDD is used, if DL and UL are switched at the wrong time between neighboring cells, significant interference is produced between radio base stations or between user terminals, so that inter-cell synchronization is important.

Figure 2B:
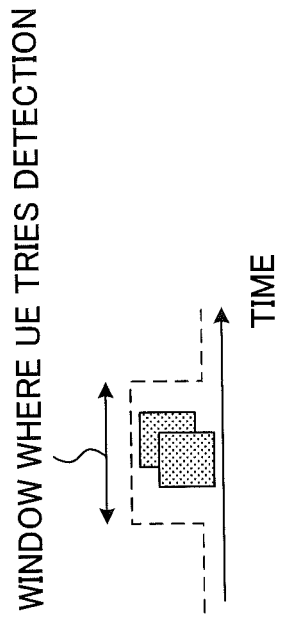
Figure 2B:
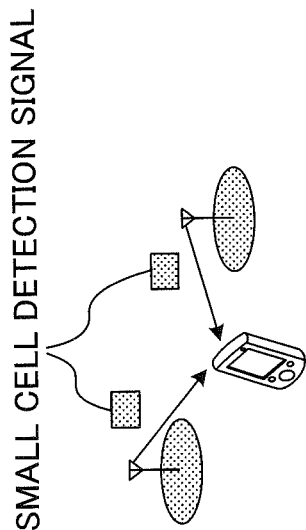

Also, a case is assumed here where a user terminal detects a small base station to connect with based on detection signals (discovery signals) that are transmitted from small base stations (see FIG. 2B). In this case, as long as the small base stations are synchronized, a plurality of small base stations can transmit detection signals all together in a short time interval, so that the user terminal has only to selectively perform the small base station detection operation in this time interval (time window). By this means, every user terminal can reduce the power consumption pertaining to the small base station detection operation and detect (discover) small base stations efficiently.

As for the method of time synchronization for small base stations, (1) time synchronization by GPS, (2) synchronization by inter-cell communication through backhaul (for example, IEEE1588v2, etc) and (3) synchronization by a radio interface may be possible. Synchronization by a radio interface (hereinafter also referred to as "radio synchronization") refers to the method of establishing synchronization by allowing a small base station to receive DL signals that are transmitted from the radio base stations of other cells, and detect time. As for the DL signals, for example, reference signals (cell-specific reference signals (CRSs), terminal-specific reference signals (DM-RSs), channel information measurement reference signals (CSI-RSs)), synchronization signals (P-SS and S-SS) and so on can be used.

The present inventors have found out that it is desirable to employ, as the method of synchronizing the small cells (small base stations) in the HetNet of above FIG. 1, synchronization by a radio interface, whereby synchronization is possible with the operator's own resource, without depending on external systems. This is because the synchronization of small base stations by an external interface can realize receivers at low cost compared to GPS receivers, the synchronization system of IEEE1588v2 and so on. Furthermore, this is also because, by using synchronization by a radio interface with a conventional synchronization method complementarily, it becomes possible to establish time synchronization between small base stations in a wider range of environments.

Figures 3A, 3B:
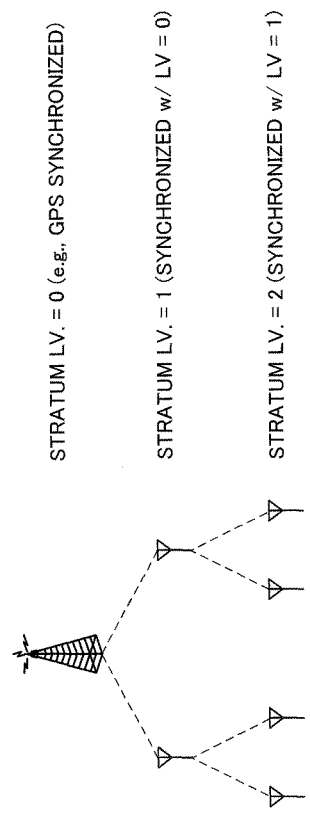
FIG. 3 provides diagrams to explain the stratum levels (stratum LVs) of mutually-synchronized radio base stations.

Now, in LTE Rel. 9, backhaul signaling to realize radio interface synchronization is provided for TDD HeNBs (Home eNodeBs) (see FIG. 3A). To be more specific, exchange of synchronization information (time synchronization info) between radio base stations via backhaul signaling is made possible. The synchronization information includes each radio base station's synchronization status (which is either synchronous (or "sync") or asynchronous (or "async")), and the synchronization stratum level ("stratum level") if synchronization is established.

A synchronization stratum level (hereinafter also referred to as "stratum LV") shows the stratum level with respect to the radio base station (for example, macro cell) that is synchronized by GPS (see FIG. 3B). For example, if a macro base station that is GPS-synchronized has a stratum LV=0, small base stations to establish synchronization by using DL signals from that radio base station have a stratum LV=1, which is one level below. That is, the stratum LV becomes one level lower than the stratum LV of the synchronizing radio base station.

In this way, when synchronizing small base stations by a radio interface, it is possible to learn, via backhaul signaling, the synchronization status and the synchronization stratum levels of the radio base stations of other cells, which are candidate synchronization targets. By this means, when establishing synchronization anew, each small base station can learn its own synchronization stratum level based on synchronization information from the radio base stations of other cells.

In this way, in a network in which neighboring macro base stations synchronize with each other and operate (synchronous NW), if a small base station can learn the stratum LVs of other cells, from which DL signals can be received, the small base station can determine the base station to be the target for synchronization. In this case, the radio base station where the stratum LV is 0 is GPS-synchronized, so that a small base station to establish synchronization anew can achieve high accuracy of synchronization by synchronizing with the radio base station to have the highest stratum LV (for example, stratum LV=0) among nearby base stations, from which DL signals can be received. Even if the small base station is going to establish radio synchronization by using a DL signal that is transmitted from a macro base station that neighbors the macro base station where the small base station belongs, if the macro base stations are synchronized with each other, the small base station can synchronize with the serving macro base station as a consequence.

However, the present inventors have found out that, if neighboring macro cells (macro base stations) operate asynchronously with each other (for example, asynchronous NW in FDD), establishing radio synchronization in the above-described manner might result in a threat that it is not possible to learn with which NW a small base station is radio-synchronized.

Figure 4:
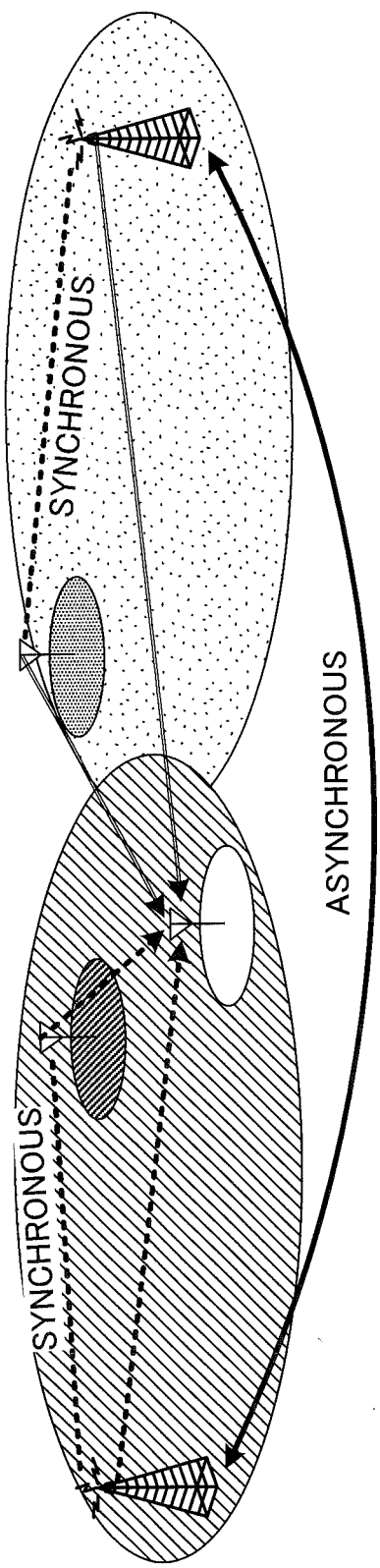
FIG. 4 is a diagram to show an example of the synchronization status of each small cell when neighboring macro base stations operate asynchronously (asynchronous NW)

For example, a small base station to establish radio synchronization anew may receive (1) DL signals from the serving macro base station, (2) DL signals from small base stations belonging to the same macro base station, (3) DL signals from neighboring macro base stations and (4) DL signals from small base stations belonging to the neighboring macro base stations (see FIG. 4).

In this case, when macro base stations operate asynchronously, there is a possibility that DL signals that are transmitted from other macro base stations and/or small base stations also become asynchronous. For example, when a small base station to try radio synchronization is unable to receive DL signals from the serving macro base station due to the impact of DL signals from neighboring cells, there is a threat that time detection using DL signals becomes difficult. In this case, the small base station needs to establish synchronization by using DL signals from other small base stations belonging to the same macro base station.

Generally speaking, the path loss in a small cell is little compared to that of a macro cell, so that it is possible to improve the received SNR of DL signals transmitted from other small base stations. However, synchronization error piles up as the number of hops required for synchronization increases (as the stratum LV becomes lower), and there is a threat of a decrease in the accuracy of synchronization.

Also, there is another possibility that a small base station to try synchronization can receive DL signals from neither the serving macro base station nor small base stations serving under that macro base station. In this case, the small base station cannot synchronize with the serving macro base station.

Figure 5:
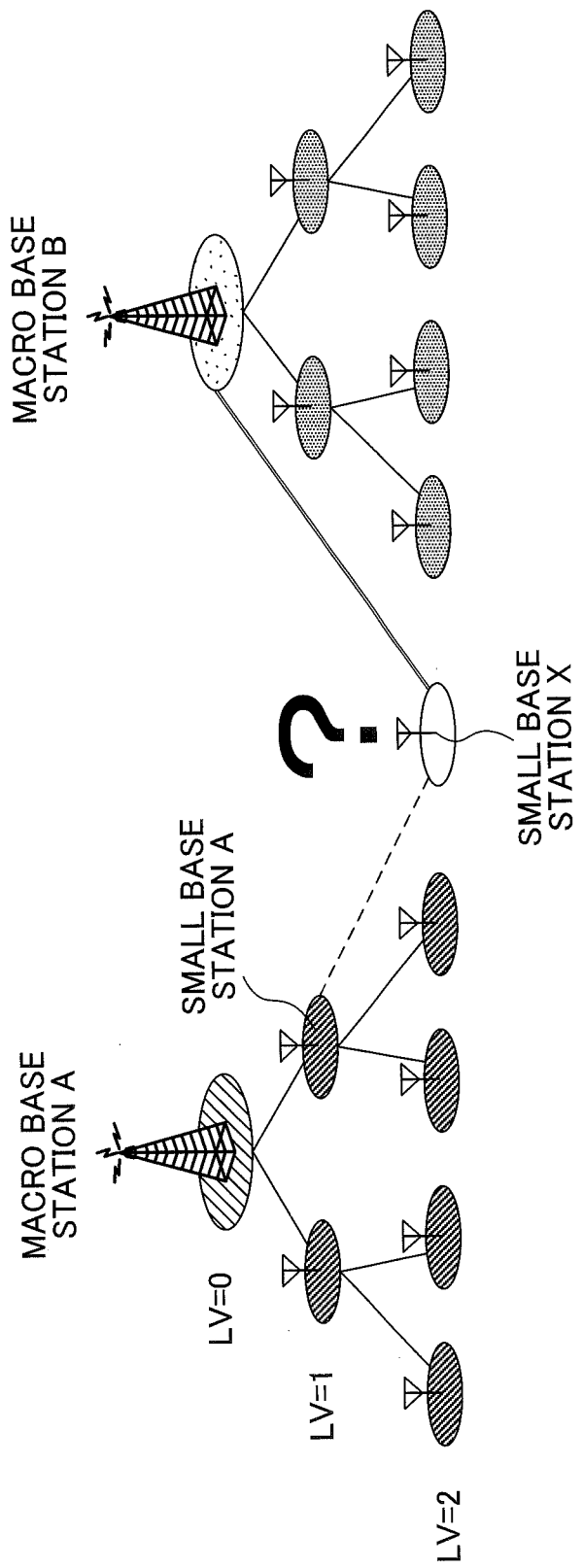
FIG. 5 provides diagrams to show an example of the stratum level of each small cell when neighboring macro base stations operate asynchronously (asynchronous NW)

In this way, in a network where neighboring macro base stations operate asynchronously (asynchronous NW), unlike a synchronous NW, even if nearby base stations' stratum LVs can be learned, there is still a threat that synchronization with the serving macro base station may not be necessarily achieved. For example, assume a case where, as shown in FIG. 5, a small base station X that serves under a macro base station A receives DL signals from a neighboring macro base station B (stratum LV=0) that operates asynchronously with the macro base station A and from a small base station A (stratum LV=1) that is synchronized with the serving macro base station A.

In this case, even if the small base station X acquires synchronization information with respect to the candidate connecting radio base stations (synchronization status and stratum LVs), the small base station X is still unable to decide which radio base station to synchronize with. Furthermore, there is a threat that the serving macro base station A cannot learn with which macro base station (or the NW formed thereby) the small base station X has established synchronization.

In view of this, the present inventors have conceived of exchanging information that represents the cell group (also referred to as "NW," "synchronization group," etc.) to constitute synchronization strata (synchronization topology) between radio base stations by using backhaul signaling between the radio base stations, when employing radio interface synchronization in an asynchronous NW.

Also, the present inventors have focused on the fact that cases occur, in a plurality of small base stations, where a serving NW (macro base station) and a NW to establish radio synchronization with (macro base station) are different, and conceived of, in such cases, allowing a user terminal to detect the connecting small base station adequately. To be more specific, the present inventors have found out controlling a macro base station to indicate the synchronization group (cell group) to establish radio synchronization with to a serving small base station, and controlling the small base station, having received the indication, to synchronize with the radio base station that is included in the synchronization group and has the highest stratum LV. Also, the present inventors have found out reporting the list of small base stations (small cells) that belong to a macro base station (macro cell) and the list of small base stations that synchronize with the macro base station, to a user terminal, to allow the user terminal to detect the connecting small cell based on these lists.

Now, the present embodiment will be described below in detail with reference to the accompanying drawings. The contents which will be described with the following first to third examples are applicable in various adequate combinations.

First Example

A case will be described with a first example where, when each small base station is synchronized by using radio interface in asynchronous NW, information to represent synchronization group is exchanged via backhaul signaling between base stations.

Figure 6:
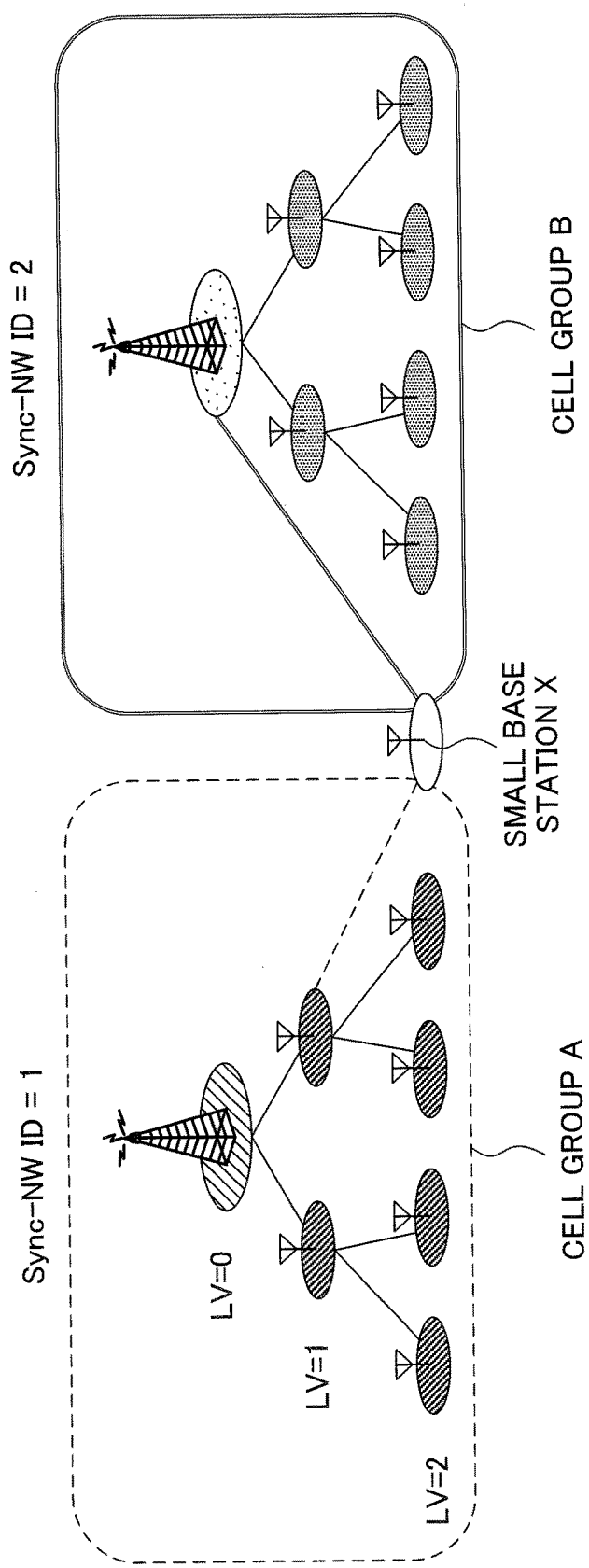
FIG. 6 provides diagrams to show an example case where information to represent cell groups that constitute synchronization strata is allocated to each network (NW) that operates asynchronously.

FIG. 6 shows a cell group A and a cell group B, which constitute mutually different synchronization strata. The cell groups A and B are each formed with a macro base station of a stratum LV=0 and small base stations of stratum LVs=1 and 2. Also, a case is assumed here where the macro base station of the cell group A and the macro base station of the cell group B operate asynchronously.

FIG. 6 assumes a case where a small base station X to establish synchronization anew receives DL signals from a small base station to belong to the cell group A (stratum LV=1) and from a macro base station to belong to the cell group B (stratum LV=0).

With the present embodiment, identifiers (for example, "Sync-NW ID") are assigned to each cell group (synchronization group) constituting synchronization strata. For example, "Sync-NW ID1" is assigned to the cell group A, and "Sync-NW ID2" is assigned to the cell group B. The small base station to establish synchronization acquires, via backhaul signaling, synchronization information to include information that represents the synchronization groups (here, Sync-NW IDs), in addition to the synchronization status (sync or async) and stratum levels (stratum LV) of the radio base stations of other cells (candidate radio base stations to synchronize with).

Based on the synchronization information of the radio base stations of other cells, the small base stations determine the cell (radio base station) to synchronize with and establish radio synchronization. After that, based on the synchronized radio base station's "stratum LV" and "sync-NW ID," the small base station learns and holds its own "stratum LV" and "sync-NW ID."

In FIG. 6, when the small base station X to synchronize anew synchronizes with the small base station (stratum LV=1) of the cell group A (Sync-NW ID1), the small base station X judges that the small base station X is "stratum LV=2" and "Sync-NW ID=1." On the other hand, when synchronizing with the macro base station (stratum LV=0) of the cell group B (Sync-NW ID2), the small base station X judges that the small base station X is "stratum LV=1" and "Sync-NW ID=2."

Also, the macro base stations and/or small base stations located around the small base station X transmit synchronization information requests (time sync info requests) to the small base station X. By this means, the synchronization information of this small base station X ("sync or async," "stratum LV," "sync-NW ID", etc.) can be acquired. Now, the steps of operation in the first example will be described below in detail.

First, the small base station X to establish radio synchronization anew detects the radio base stations of other cells with which radio synchronization is possible, based on a search and measurements of nearby cells. FIG. 6 shows a case where the small base station (stratum LV=1) of the cell group A (Sync-NW ID1) and the macro base station (stratum LV=0) of the cell group B (Sync-NW ID2) are detected.

Following this, the small base station X transmits a synchronization information request (time sync info request) to the radio base stations where the small base station X judges radio synchronization is possible. The macro base station and/or the small base station having received the synchronization information request feed back synchronization information ("sync or async," "stratum LV," "Sync-NW ID," etc.).

The small base station X having received the synchronization information of other cells from the radio base stations of these other cells determines the cell to establish radio synchronization with (target base station) based on the synchronization information received. The small base station X learns its own "stratum LV" and "Sync-NW ID" based on the synchronization information of the radio base station to establish radio synchronization with.

Also, a macro base station, by transmitting a synchronization information request (time sync info request) to its serving small base stations, can learn whether each small base station is synchronous or asynchronous with respect to that macro base station.

In this way, by exchanging information to represent synchronization groups between radio base stations, even in an asynchronous NW, a small base station can learn the synchronization targets of candidate radio base stations for synchronization, and adequately determine the cell group to synchronize with. For example, the small base station X to establish synchronization anew determines the radio base station to synchronize with, by prioritizing the Sync-NW ID of the serving macro base station, based on the synchronization information acquired from the radio base stations of other cells. In the case illustrated in FIG. 6, the small base station X synchronizes with the small base station (stratum LV=1) of the cell group A (Sync-NW ID1).

In this way, when the Sync-NW ID to correspond to the serving macro base station is prioritized, since the coordination/master-slave relationship and the synchronization relationship between the macro base station and small base stations are provided on a one-to-one basis, the macro base station and the small base stations can coordinate effectively. For example, a user terminal can efficiently detect the detection signals (discovery signals) transmitted from the small base stations, and also the macro base station can schedule the small base stations efficiently. Also, the user terminal can connect with both the macro base station and the small base stations adequately (dual connectivity).

Alternatively, as in the above-described case of TDD, the small base station X to establish synchronization anew may determine the radio base station to synchronize with by prioritizing the radio base stations of higher synchronization stratum levels (stratum LVs). In the case shown in FIG. 6, the small base station X synchronizes with the macro base station (stratum LV=0) of the cell group B (Sync-NW ID2).

In this way, when the synchronization target is determined by prioritizing the stratum LV, a synchronous NW is formed in an autonomous distributed manner so that the accuracy of synchronization increases. Consequently, small cells need not be placed systematically, and can be placed flexibly.

Note that, when a small base station determines the base station to synchronize with, the indicator to prioritize (the ranking of priority in synchronization information), the radio base station to synchronize with may be determined based on a predetermined indicator, or may be changed as appropriate by means of signaling from the macro base station.

Also, with the present embodiment, the macro base station of the stratum LV=0 can determine the synchronization target of the serving small base stations (whether they are synchronous or asynchronous with respect to this macro base station) by transmitting a synchronization information request (time sync info request) to the serving small base stations. In this way, by allowing the macro base station to learn the synchronization target of the serving small base stations, it is possible to change and control the method of operation adequately between synchronous small base stations and asynchronous small base stations.

For example, the macro base station commands, to the synchronous small base stations, transmission of detection signals (discovery signals) in a resource efficient manner (command simultaneous transmission in a predetermined period), dual connectivity for user terminals, and interference control (eICIC) between the small base stations. On the other hand, with asynchronous small base stations, the macro base station executes cell detection by means of PSS/SSS and interference control (eICIC) with respect to small base stations belonging to neighboring macro base stations.

<Variation>

Note that, although a case has been described with the above description where Sync-NW IDs are used as the information (identifiers) to represent the cell groups constituting synchronization strata, the present embodiment is by no means limited to this. For example, the cell ID of the stratum LV=0 in each cell group (for example, macro cell ID) may be used as information to represent the cell group. By this means, without introducing new IDs, by reporting the cell IDs of stratum LV=0 instead of Sync-NW IDs, a small cell that is going to establish synchronization anew is able to identify the NW to synchronize with.

Besides, as information to represent the cell groups to constitute synchronization strata, information as to "whether or not synchronization is established with others besides the serving macro cell" may be used as well. For example, a case may occur where, when the small base station X tries radio synchronization, there is little possibility that three or more asynchronous NWs are detected. In this case, the state in which radio synchronization is established with others besides the serving macro base station may be interpreted such that radio synchronization is established with a neighboring macro base station. By this means, compared to the case of using the Sync-NW ID and cell ID, it is possible to reduce the additional bits of backhaul signaling (reduce to one bit).

Figure 7:
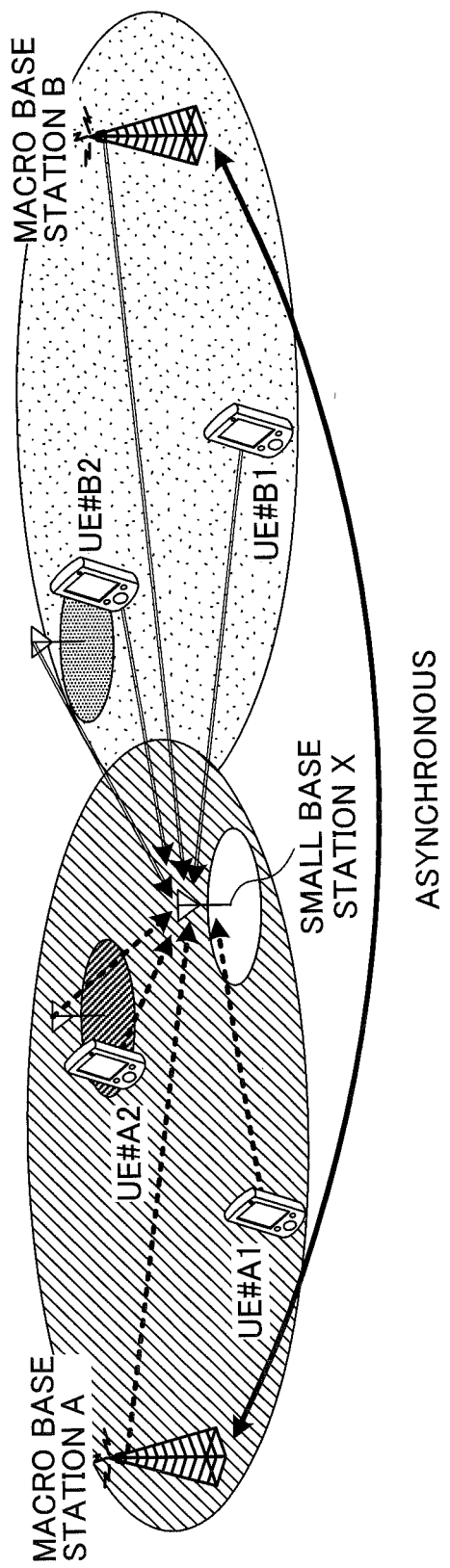

Also, although a case has been shown with the above description where the small base station X to establish radio synchronization selects the NW to synchronize with (macro base station) based on DL signals transmitted from the radio base stations of nearby cells, this is by no means limiting. For example, the NW to be the synchronization target may be selected with reference to UL signals transmitted from user terminals (see FIG. 7). Note that, in the event of an asynchronous NW, a user terminal A1 to connect with a macro base station A and a user terminal A2 to connect with a small base station synchronized with the macro base station A are synchronized. Similarly, a user terminal B1 to connect with a macro base station B and a user terminal B2 to connect with a small base station synchronized with the macro base station B are synchronized. On the other hand, the user terminals A1 and A2 and the user terminals B1 and B2, belonging to different cell groups (synchronous NWs), are asynchronous.

Second Example

With a second example, a method will be described in which, when radio interface synchronization is employed in an asynchronous NW, the synchronization target (synchronization group) is indicated to small base stations and controlled. In the following description, a case will be shown where the target of synchronization is indicated to small base stations where the serving NW (macro cell) and the NW to establish radio synchronization with (macro cell) are different.

As described above, when a small base station synchronizes with a neighboring macro base station in an asynchronous NW, the serving NW (macro base station) and the NW to establish radio synchronization with (macro base station) become different. Note that the NW (macro base station) where the small base station belongs refers to the cell group which applies macro-assisted operation (macro coordination) to the small base station. As macro-assisted operation, for example, the macro base station may report small base station detection information and control information to user terminals, the macro base station may apply carrier aggregation (in the event different frequencies are used) to add the small cells of small base stations or coordinated multi-point communication (in the event the same frequency is used) to the terminals connected to the macro cell. On the other hand, the NW (macro base station) with which a small base station synchronizes refers to the cell group with which the small base station establishes time synchronization.

Figure 8:
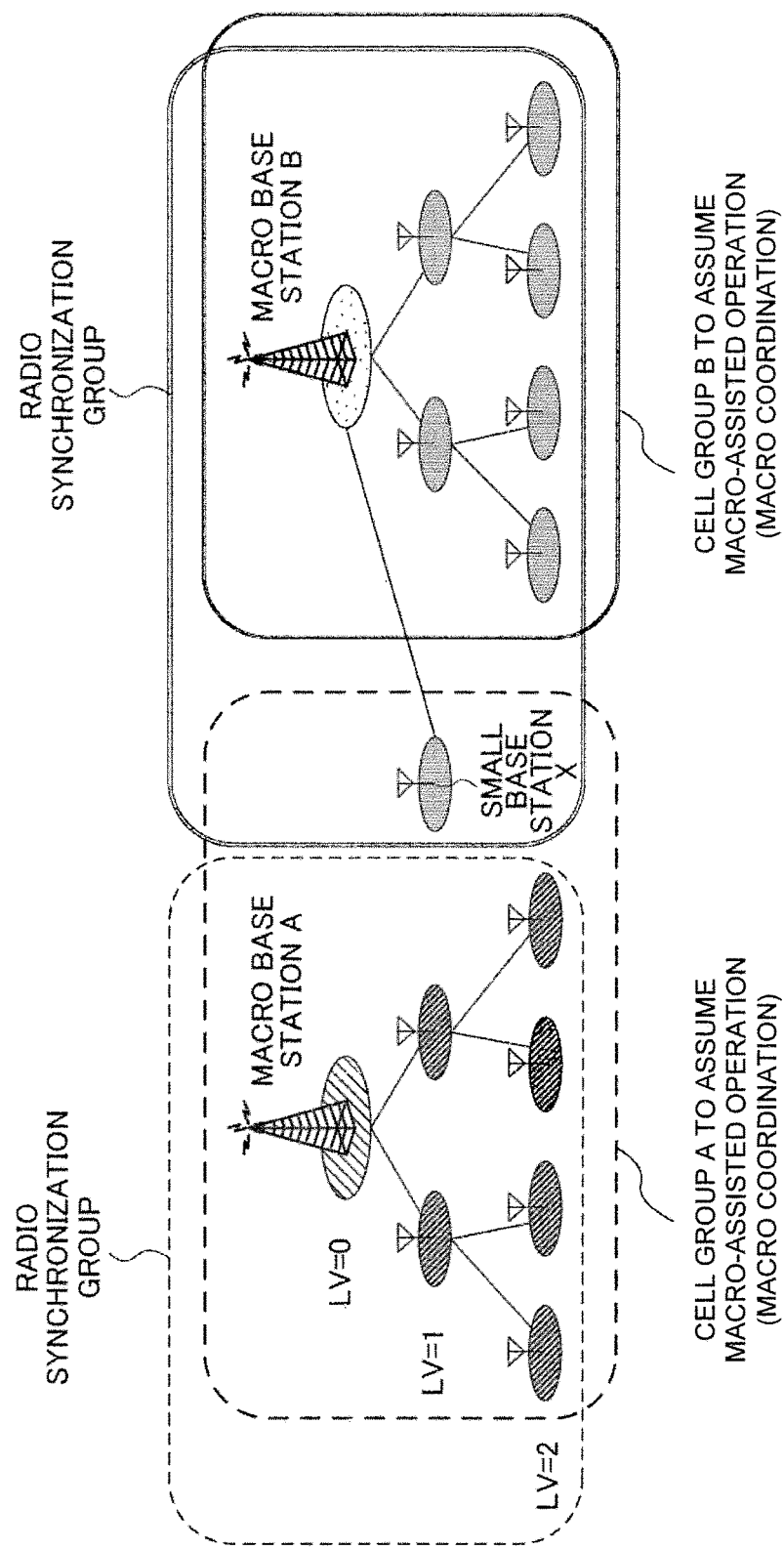
FIG. 8 is a diagram to show the relationship between radio synchronization groups and cell groups that work in macro coordination in an asynchronous NW.

For example, referring to the case illustrated in FIG. 8, the small base station X serves under the macro base station A of the cell group A but is also radio-synchronized with the macro base station B of the cell group B. Note that a case is shown here where the small base station X is located in the macro base station A's cell edge and connected with the macro base station A of the cell group A in a coordinating relationship, and, meanwhile, establishes radio synchronization with the radio base station B of the cell group B.

Also, information to represent synchronization groups, which was added anew as synchronization information in the above first example, is "the rule for a small base station to select the synchronization target" and "information from which a macro base station learns the synchronization target of small base stations." Consequently, a small base station selects the target of synchronization autonomously, depending on the location of installation, the priority of the synchronization information that is employed when determining the radio base station to synchronize with (Sync-NW ID or synchronization stratum level) and so on.

Figure 9:
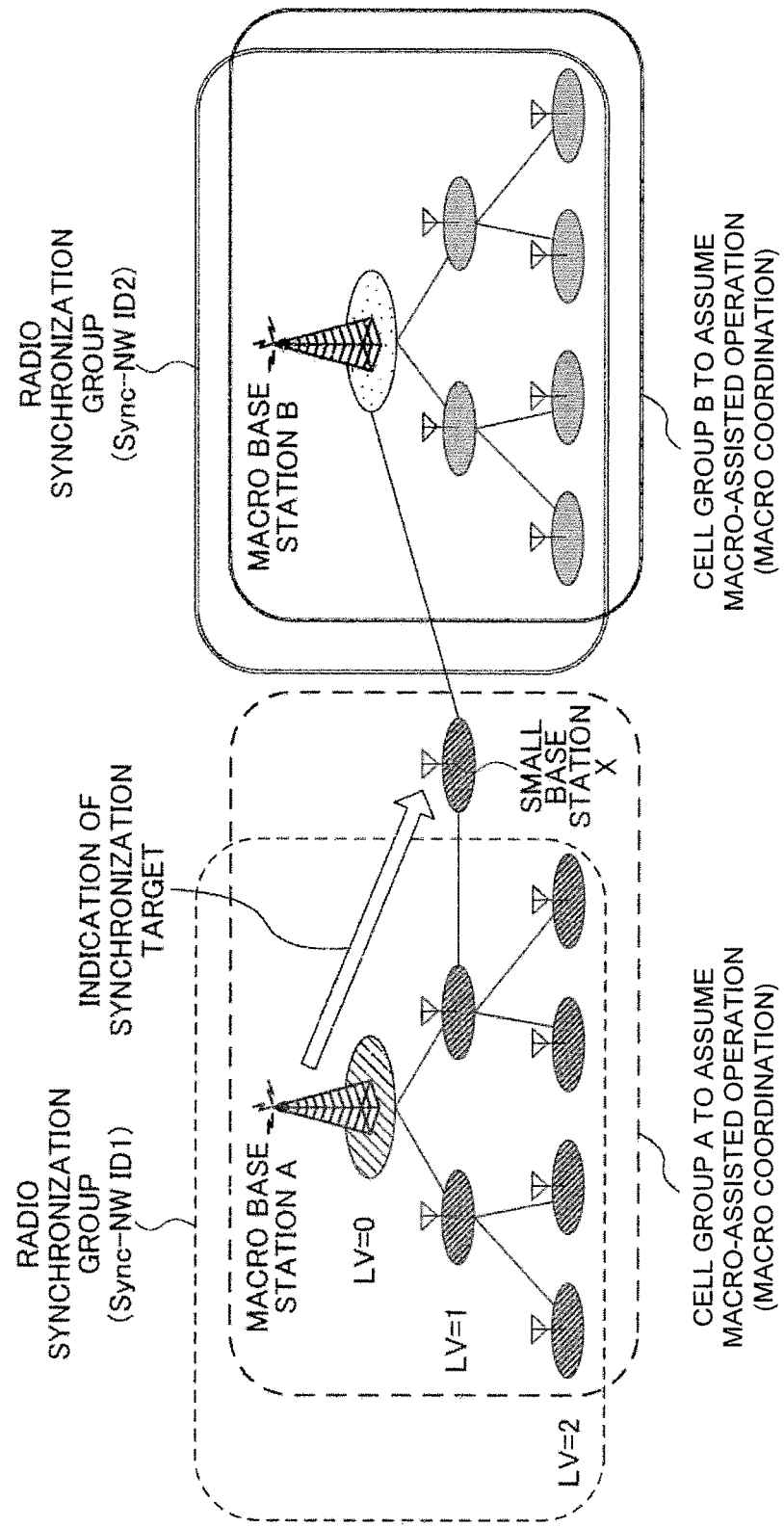
FIG. 9 is a diagram to show an example method of providing a synchronization command from a macro base station to a serving small cell in an asynchronous NW.

So, with the second example, a synchronous NW (macro base station) indicates information to represent the cell group of the synchronization target (for example, sync-NW ID) to a small base station. For example, in the above FIG. 8, the macro base station A of the cell group A reports the Sync-NW ID1 to the small base station X (see FIG. 9). The indication to the small base station X may be sent via a backhaul link. Also, as has been described with the above variation of the first example, the cell ID of the macro cell included in the synchronization group may be used instead of the Sync-NW ID.

The small base station X, having received the indication of the synchronization target, transmits a synchronization information request (time sync info request) to the radio base stations of nearby cells, and acquires other cells' synchronization information (stratum LVs, sync-NW IDs. etc.). Then, based on the synchronization information acquired, the small base station X synchronizes with the small base station that has the indicated Sync-NW ID1 and the highest stratum LV. Also, after having synchronized with a radio base station of another cell, the small base station X updates the synchronization information of the small base station X (time sync info).

In this way, with the second example, the serving NW (macro base station) reports information to represent the cell group of the synchronization target to a small base station and controls the synchronization target of this small base station. By this means, it is possible to make the small base station synchronous and asynchronous, control interference against user terminals, and realize efficient transmission of detection signals (discovery signals), depending on the traffic and the level of interference in this macro base station and nearby macro base stations, the operation of small base stations and so on.

For example, in a time period in which the traffic in a neighboring macro base station is heavy, a macro base station synchronizes cell-edge small base stations with the cell group to correspond to the neighboring macro base station, and applies interference control (eICIC). Also, in a time period in which the traffic in this macro base station is heavy, the macro base station synchronizes the cell-edge small base stations with the cell group to correspond to that macro base station, and makes a plurality of synchronous small base stations transmit detection signals all together in a predetermined period. By this means, it is possible to increase the number of small cells which a user terminal can discover in a short period of time.

Third Example

A method will be described with a third example whereby, a user terminal efficiently detects the small cell base station to connect with even when synchronous small cells and asynchronous small cells coexist in a macro cell.

Figure 10:
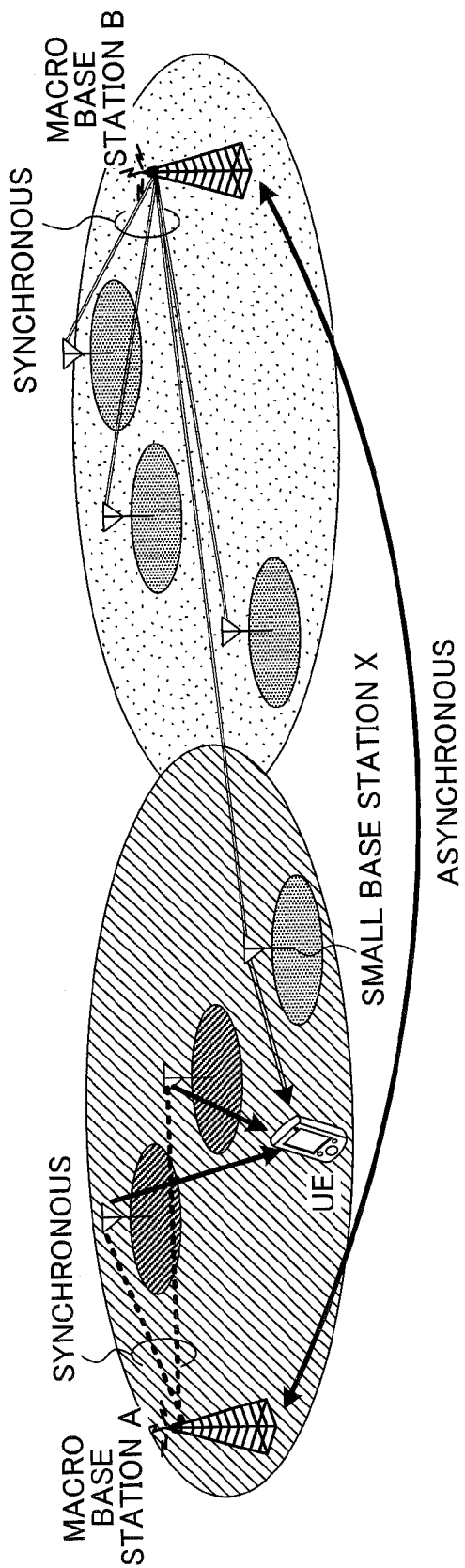
FIG. 10 is a diagram to show an example case where synchronized small cells and unsynchronized small cells co-exist in a macro cell.

As described above, in an asynchronous NW, when the small base station X synchronizes with the synchronization group to correspond to the neighboring macro base station B, cases occur where synchronous small cells and asynchronous small cells coexist the macro cell (see FIG. 10). In FIG. 10, the user terminal, connected to the macro base station A of the cell group A, can discover a plurality of synchronous small base stations in a short time interval, there is a threat that the user terminal cannot discover the asynchronous small base station X by the same mechanism (in the same time interval). Nevertheless, given that even the asynchronous small base station X can be made the target of off-loading depending on the condition of traffic, it is preferable to employ mechanism that allows the user terminal to discover the asynchronous small base station X as well.

So, with the third example, information about the small base stations which the macro base station can assist (small base stations serving under the macro base station) (hereinafter also referred to as "list A") and information about the small base stations that synchronize with the synchronization stratum (stratum) formed by that macro base station (hereinafter also referred to as "list B"), are reported to user terminals. The information about the small base stations (small cells) to be contained in each list may include the carrier frequency and bandwidth of the small base stations of the small cells operated by the small base stations, the cell IDs of the small cells (physical cell IDs), the sequences of small cell detection signals, information about the time/frequency resources of the detection signals, the bandwidth of the detection signals and so on.

Here, the lists may contain information as to whether a carrier is a carrier to have backward compatibility (backward-compatible carrier) or not (new carrier type). The detection operation that is suitable for a user terminal changes depending on whether backward compatibility is provided or not, so that, by including this piece of information in the lists, user terminals can perform adequate detection operation per carrier. In other words, it is possible to omit redundant detection operation and reduce the wasteful power consumption. Also, it may be possible to report virtual cell IDs instead of cell IDs. Since virtual cell IDs can be assigned more flexibly than cell IDs, for example, it is possible to assign the same virtual cell ID between small cells, so that a user terminal can detect these cells as one cell and skip the operation for searching for many candidate cells.

The small base stations included in the list A refer to small base stations that can connect and coordinate with the macro base station regardless of being synchronous or asynchronous. For example, these are equivalent to the cell group A in the above FIG. 8, which assumes macro-assisted operation (macro coordination).

The small base stations included in the list B refer to the small base stations that are left after asynchronous small base stations are removed from the list A, and small base stations that serve under nearby macro base stations and that are synchronized with the subject macro base station are added. In the above FIG. 8, these are equivalent to the radio synchronization groups.

Figure 11:
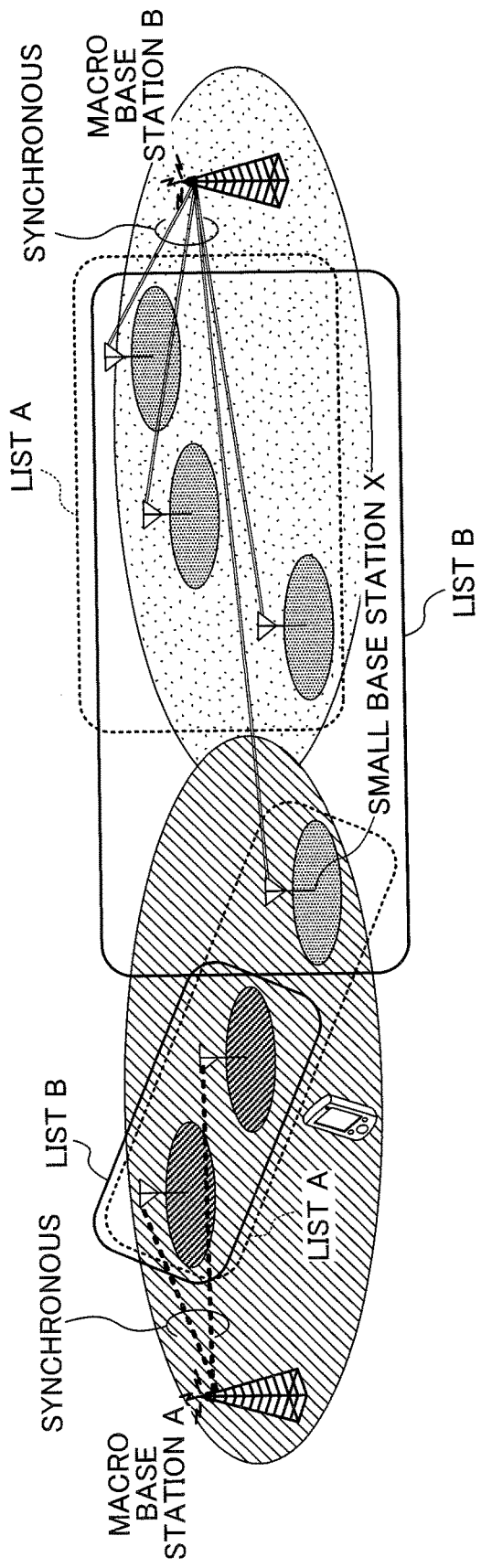
FIG. 11 is a diagram to show an example case where macro cells report lists to user terminals.

For example, in the example shown in the FIG. 10, in the NW to correspond to the macro base station A, three small base stations which the macro base station A can assist are included in the list A, and two small cells that are left after the small base station X synchronized with the macro base station B of a neighboring cell is removed from the list A are included in the list B (see FIG. 11).

On the other hand, in the NW to correspond to the macro base station B, three small base stations which the macro base station B can assist are included in the list A, and four small base stations, where, among the small base stations of the macro base station A of a neighboring cell, the small base station X that is synchronized with the macro base station B is added, are included in the list B (see FIG. 11).

A user terminal discovers small base stations based on the list A and the list B. To be more specific, the user terminal first executes synchronous discovery for connectable small base stations based on the list B. Also, when no connecting small base station is found in a predetermined period, the user terminal executes asynchronous discovery based on the list A.

The purpose of the synchronous discovery is to detect discovery DL signals that are transmitted from the small base stations that are time-synchronized with the macro base station, and a user terminal tries to discover small base stations in a short time interval of observation (short-term window) as commanded by the macro base station A. Small base stations that are synchronized with the macro base station A can transmit discovery DL signals in synchronization, so that the user terminal can discover a plurality of small cells efficiently, by way of synchronous discovery.

The purpose of asynchronous discovery is to detect the discovery DL signals transmitted from the small base station X that is not necessarily time-synchronized with the macro base station A, and a user terminal needs to try discovering the small base station X over a long time interval (for example, several ms). Also, even when the user terminal discovers the asynchronous small base station X, since this small base station X is asynchronous with the connecting macro base station A, it is necessary to establish synchronization between the small base station X and the user terminal.

In this way, the user terminal performs the detection operation by prioritizing the small base stations that are included in the synchronization group corresponding to the macro base station (list B), so that, if small base stations can be detected in synchronous discovery that is executed first, it is not necessary to execute asynchronous discovery. As a result of this, the user terminal can save the power consumption required for asynchronous discovery, and the power consumption which the user terminal would require to synchronize with the asynchronous small base station X.

Also, even when no small base station can be discovered in synchronous discovery, the user terminal can try the detection operation with respect to all the small base stations included in the list A in the end. By this means, regardless of whether small base stations are synchronous or asynchronous, it is possible to achieve an off-loading effect to match the number of small base stations.

(Structure of Radio Communication System)

Now, a structure of a radio communication system according to the present embodiment will be described below. In this radio communication system, the radio communication methods according to the above first to third examples are employed. Note that the radio communication methods according to the first to third examples may be employed independently or may be employed in combinations.

Figure 12:
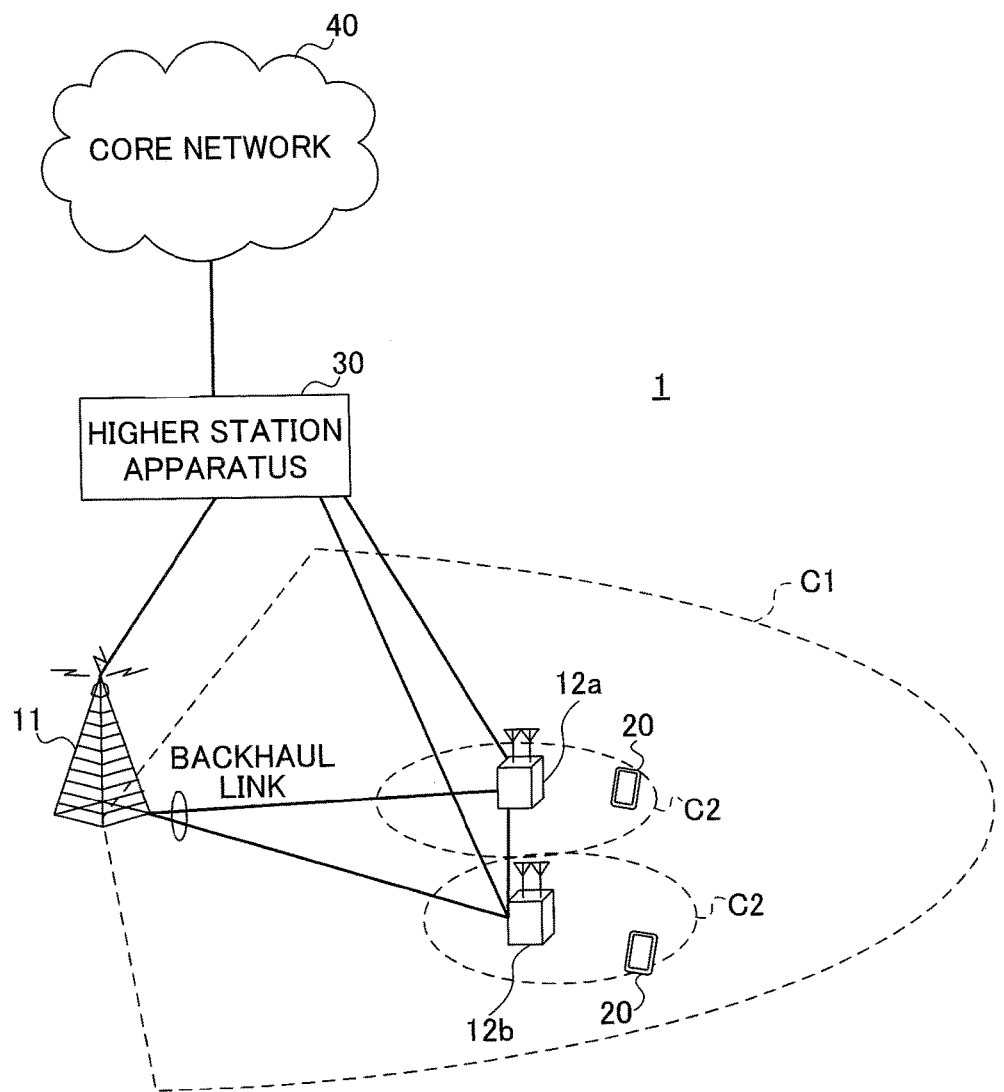
FIG. 12 is a schematic diagram to show an example of a radio communication system according to the present embodiment.

FIG. 12 is a schematic configuration diagram of a radio communication system according to the present embodiment. As shown in FIG. 12, the radio communication system 1 includes a macro base station 11, which forms a macro cell C1, and small base stations 12a and 12b, which are placed in the macro cell C1 and which form small cells C2 that are narrower than the macro cell C1. The user terminals 20 are structured to be capable of carrying out radio communication with the macro base station 11 and at least one of the small base stations 12a and 12b (hereinafter collectively referred to as "small base stations 12"). Note that the number of the macro base station 11 and the small base stations 12 are by no means limited to the number illustrated in FIG. 12.

In the macro cell C1 and the small cells C2, the same frequency band may be used, or different frequency bands may be used. Also, the macro base station 11 and each small base station 12 are connected with each other via an inter-base station interface (for example, optical fiber, X2 interface, etc.). The macro base station 11 and the small base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "HeNBs (Home eNodeBs)," "transmission points," "eNodeBs (eNBs)" and so on. The user terminals 20 are terminals to support various communication schemes such as LTE and LTE-A, and may not only be mobile communication terminals, but may also include fixed communication terminals as well.

The radio communication system 1 assumes cases where the networks that are formed per macro cell are asynchronous (asynchronous operation). Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

Also, in the radio communication system 1, a downlink shared channel (PDSCH: Physical Downlink Shared Channel), which is used by each user terminal 20 on a shared basis, a downlink control channel (PDCCH (Physical Downlink Control Channel), an EPDCCH (Enhanced Physical Downlink Control Channel), a PCFICH, a PHICH, a broadcast channel (PBCH) and so on are used as downlink communication channels. User data and higher layer control information are transmitted by the PDSCH. Downlink control information (DCI) is transmitted by the PDCCH and the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink communication channels. User data and higher layer control information are transmitted by the PUSCH. Also, by means of the PUCCH, downlink radio quality information (CQI: Channel Quality Indicator), delivery acknowledgement information (ACKs/NACKs) and so on are transmitted.

Hereinafter, the macro base station 11 and the small base stations 12 will be collectively referred to as "radio base station 10," unless distinction needs to be drawn otherwise.

Figure 13:
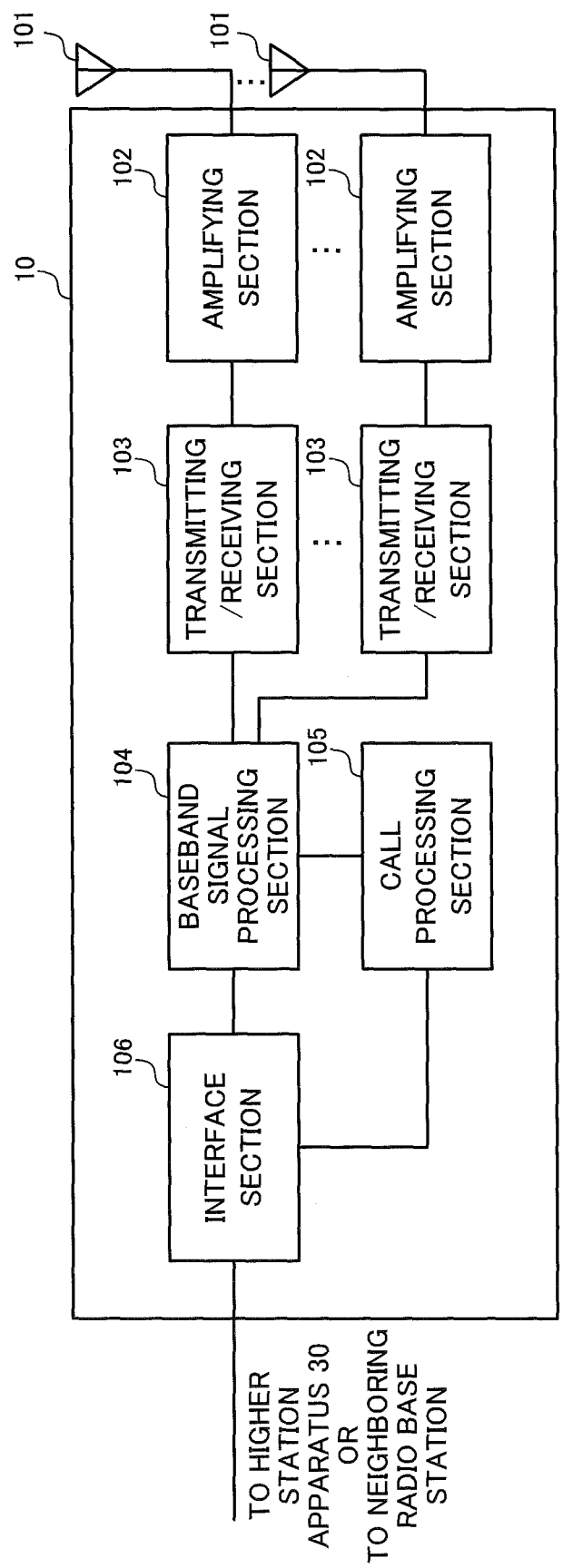
FIG. 13 is a diagram to explain an overall structure of a radio base station according to the present embodiment.

FIG. 13 is a diagram to show an overall structure of a radio base station 10 according to the present embodiment. The radio base station 10 has a plurality of transmitting/receiving antennas 101 for MIMO transmission, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is transferred to each transmitting/receiving section 103. Furthermore, downlink control signals are also subjected to transmission processes such as channel coding and an inverse fast Fourier transform, and transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for uplink signals, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input uplink signals is subjected to an FFT process, an IDFT process, error correction decoding, a MAC retransmission control receiving process, and RLC layer and PDCP layer receiving processes, and transferred to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, X2 interface, etc.). Alternatively, the interface section 106 transmits and receives signals to and from the higher station apparatus 30 via a predetermined interface.

Figure 14:
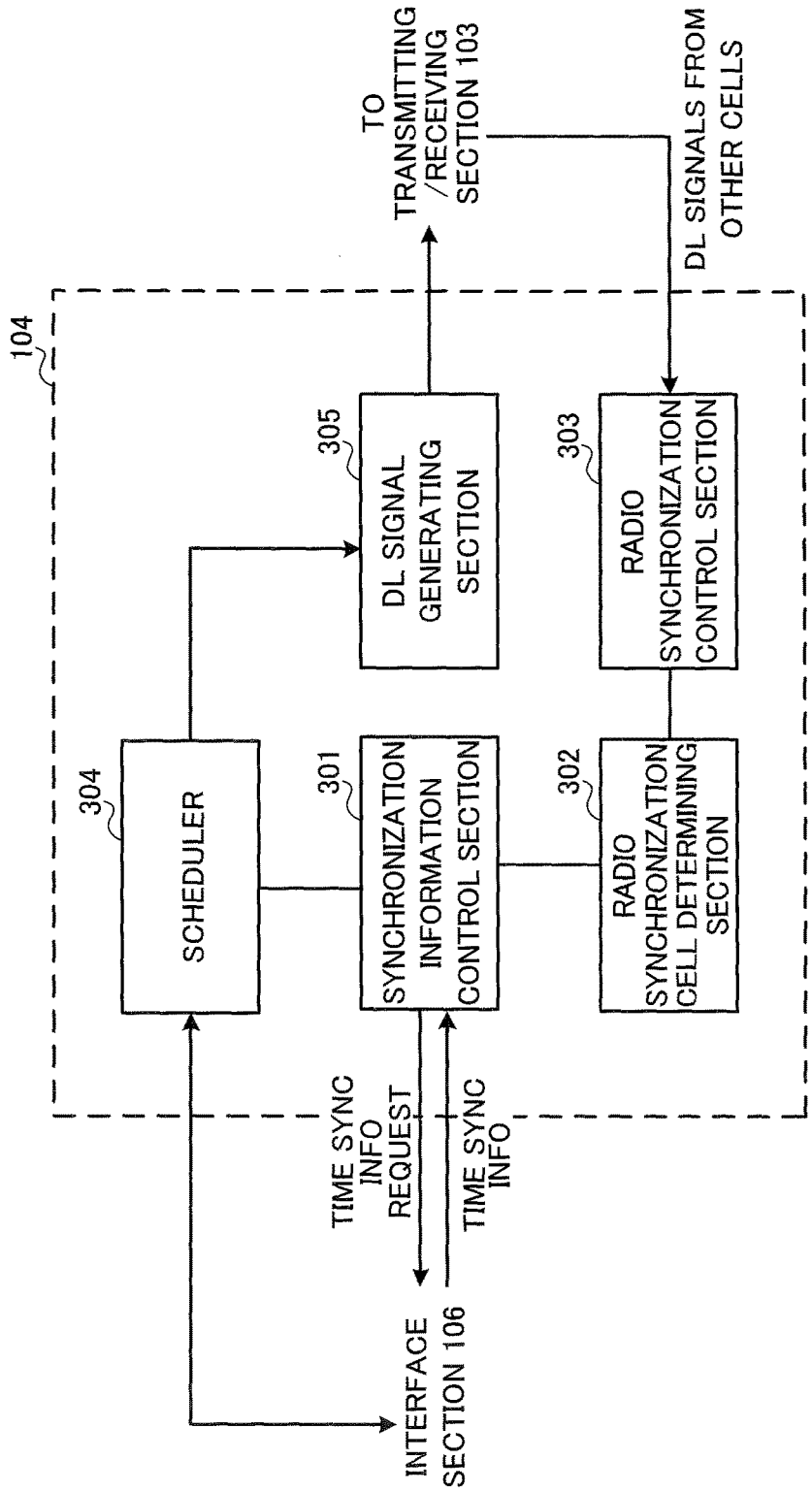
FIG. 14 is a diagram to explain a functional structure of a small base station according to the present embodiment.

FIG. 14 is a diagram to show a functional structure of a radio base station 12 (small base station) according to the present embodiment. Note that the following functional structure is formed with the baseband signal processing section 104 provided in the radio base station 12 and so on.

As shown in the FIG. 14, the radio base station 12 has a synchronization information control section 301, a radio synchronization cell determining section 302, a radio synchronization control section 303, a scheduler 304 and a DL signal generating section 305.

The synchronization information control section 301 transmits and receives signals to and from the radio base stations of other cells via the interface section 106 (backhaul signaling). To be more specific, the synchronization information control section 301 transmits a synchronization information request (time sync info request) to the radio base stations where radio synchronization is judged to be possible, via backhaul. Also, the synchronization information control section 301 receives synchronization information that is fed back from the macro base stations and/or the small base stations having received the synchronization information request. The synchronization information includes the synchronization status (sync or async), the synchronization stratum levels (stratum LVs), and information to represent the cell group of the synchronization target (for example, Sync-NW ID). Also, the synchronization information control section 301 can identify the radio base stations where radio synchronization is possible, by way of a search and measurements of nearby cells.

The radio synchronization cell determining section 302 determines the cell to establish radio synchronization with (the radio base station to synchronize with) based on the synchronization information of the other cells received from the radio base stations of these other cells. For example, when the radio synchronization cell determining section 302 receives synchronization information from the radio base stations of a plurality of other cells, the radio synchronization cell determining section 302 determines the radio base station to establish radio synchronization with by prioritizing either the synchronization stratum level (radio base stations of higher stratum LVs) or the information to represent the cell group of the synchronization target (for example, Sync-NW ID).

When the radio base station to establish radio synchronization with is determined in the radio synchronization cell determining section 302, the synchronization information control section 301 holds the "Stratum LV" and "Sync-NW ID" of the subject base station based on the synchronization information of the radio base station to establish radio synchronization with. Note that a memory section to hold the "Stratum LV" and "Sync-NW ID" may be provided separately.

The radio synchronization control section 303 acquires time synchronization by using DL signals transmitted from the radio base station of the synchronization target determined in the radio synchronization cell determining section 302. The DL signals that are applicable to time synchronization include, for example, reference signals (the cell-specific reference signal (CRS), the terminal-specific reference signal (DM-RS), the channel information measurement reference signal (CSI-RS), etc.), synchronization signals (P-SS and S-SS) and so on.

The scheduler 304 allocates radio resources for DL signals to transmit to the user terminal 20 (scheduling). For example, when detection signals (discovery signals) are transmitted to the user terminal 20, the detection signals are controlled to be transmitted in a predetermined period. Also, when the small base station 12 is synchronized with another small base station, the detection signals are controlled to be transmitted from a plurality of small base stations in a predetermined period.

The DL signal generating section 305 generates DL signals based on commands from the scheduler 304. For example, the DL signal generating section 305 generates control signals, data signals, reference signals and so on. Also, the DL signal generating section 305 generates detection signals (discovery signals) for allowing the user terminal 20 to discover the small base station. The signals generated in the DL signal generating section 305 are transmitted to the user terminal 20 and the radio base stations of other cells via the transmitting/receiving sections 103.

Figure 15:
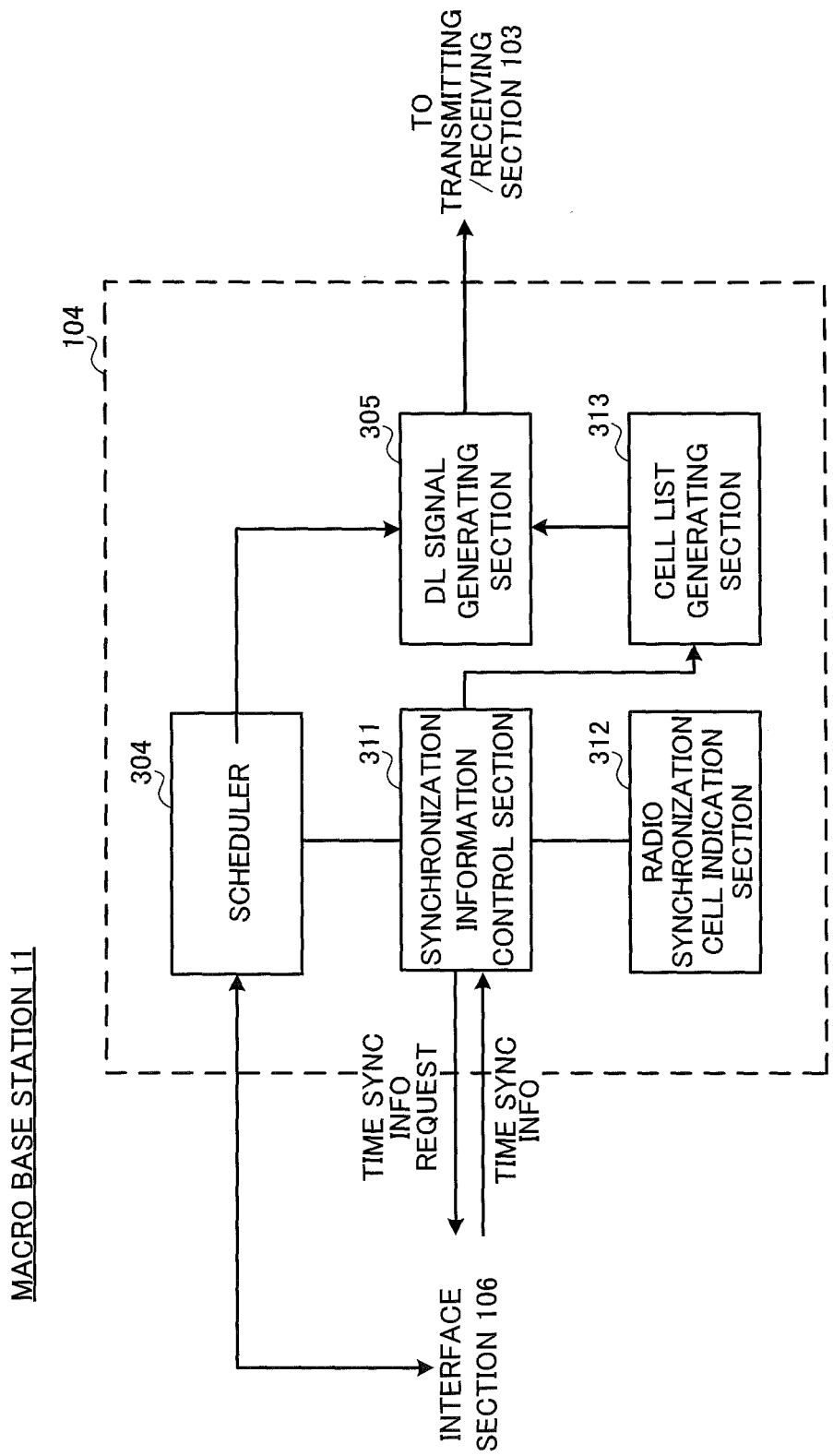
FIG. 15 is a diagram to explain a functional structure of a macro base station according to the present embodiment.

FIG. 15 is a diagram to show a functional structure of a radio base station 11 (macro base station) according to the present embodiment. Note that the following functional structure is formed with the baseband signal processing section 104 provided in the radio base station 11 and so on.

As shown in the FIG. 15, the radio base station 11 has a synchronization information control section 311, a radio synchronization cell indicating section 312, a cell list generating section 313, a scheduler 304 and a DL signal generating section 305.

The synchronization information control section 311 transmits and receives signals to and from small base stations 12 via the interface section 106 (backhaul signaling). To be more specific, the synchronization information control section 311 transmits a synchronization information request (time sync info request) to the serving small base stations 12 via backhaul, and receives synchronization information that is fed back from the serving small base stations. The synchronization information includes the synchronization status (sync or async), the synchronization stratum levels (stratum LVs) and information to represent the cell group of the synchronization target (for example, Sync-NW ID). The synchronization information control section 311 identifies the synchronization target of the serving small base station (whether they are synchronous or asynchronous with respect to the macro base station) based on the synchronization information that is acquired. For example, by allowing the macro base station to learn the synchronization target of the serving small base stations, the scheduler 304 can adequately change and control the operating method between synchronous small base stations and asynchronous small base stations as appropriate.

Also, the radio synchronization cell indicating section 312 indicates the synchronization target to the serving small base stations 11. For example, as shown in the above FIG. 8, to small base stations where the serving NW (macro base station) and the NW to establish radio synchronization with (macro base station) are different, information to represent the cell group to synchronize with (for example, Sync-NW ID corresponding to the serving macro base station) is indicated (see above FIG. 9).

The cell list generating section 313 generates information about the small base stations which the macro base station 11 can assist (list A), and information about the small base stations to synchronize with the radio synchronization group corresponding to that macro base station 11 (list B) (see above FIG. 11). The lists generated in the cell list generating section 313 are transmitted to the user terminal 20 by using higher layer signaling (for example, RRC signaling, broadcast signal, etc.) and downlink control information.

Figure 16:
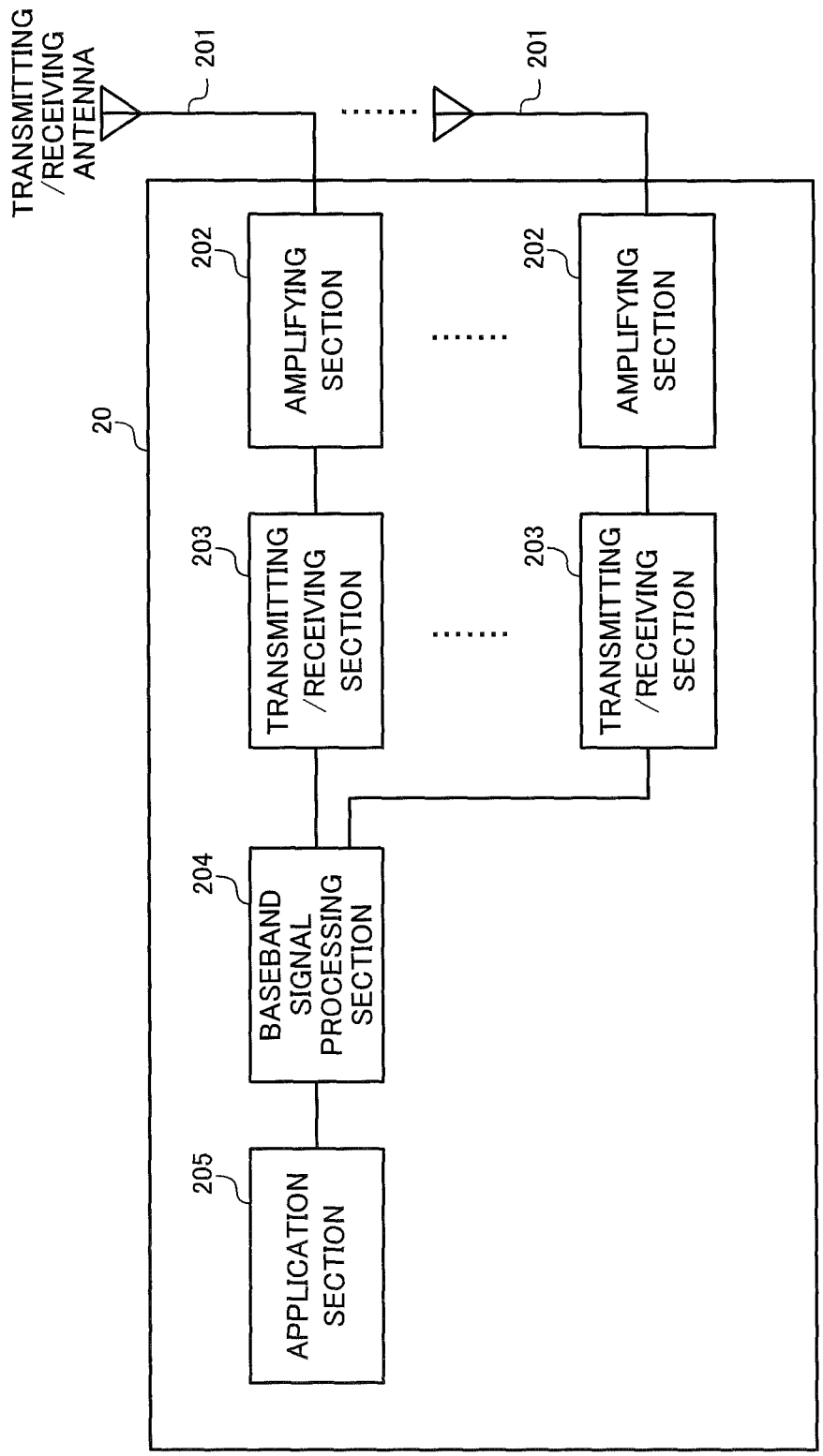
FIG. 16 is a diagram to explain an overall structure of a user terminal according to the present embodiment.

FIG. 16 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203.

After that, the amplifying sections 202 amplify the radio frequency signals having been subjected to frequency conversion, and transmit the results from the transmitting/receiving antennas 201.

Figure 17:
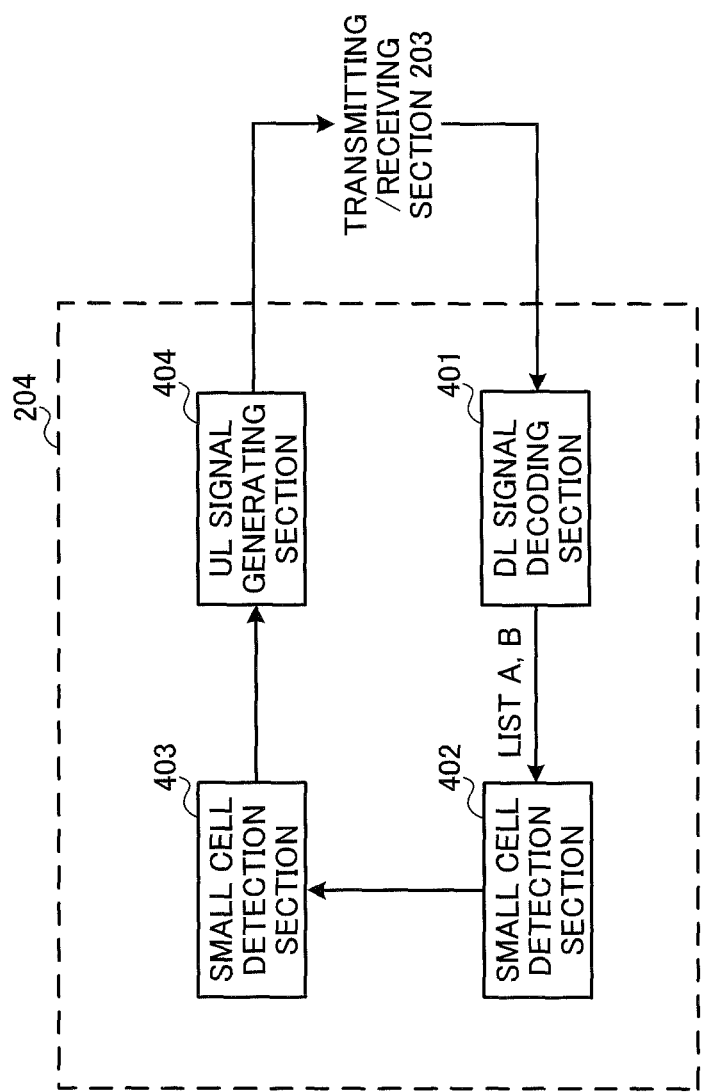
FIG. 17 is a diagram to explain a functional structure of a user terminal according to the present embodiment.

FIG. 17 is a diagram to show a principle functional structure of the baseband signal processing section 204 provided in a user terminal 20. As shown in FIG. 17, the baseband signal processing section 204 provided in the user terminal 20 is comprised at least of a DL signal decoding section 401, a small cell detection section 402, a control section 403 and a UL signal generating section 404.

The DL signal decoding section 401 decodes the DL signals transmitted from the radio base stations 11 and 12. For example, when information about small base stations (lists A and B) is transmitted from the macro base station 11 (see above FIG. 11), the information of these lists is output to the small cell detection section 402.

The small cell detection section 402 detects the connecting small base station based on the detection signals (discovery signals) transmitted from small base stations 12. When a plurality of small base stations are detected, a predetermined small base station is selected base on received quality and so on. Also, when the information about small base stations transmitted from the macro base station 11 (lists A and B) is received, a small base station is detected based on these lists.

The control section 403 controls the allocation of uplink control signals (feedback signals) and uplink data signals to radio resources based on downlink control signals (uplink grant) transmitted from the radio base stations. The UL signal generating section 404 generates uplink control signals (feedback signals such as delivery acknowledgement signals, channel state information (CSI) and so on) based on commands from the control section 403. Also, the UL signal generating section 404 generates uplink data signals based on commands from the control section 403.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way. For example, the examples described above may be combined and implemented as appropriate.

The disclosure of Japanese Patent Application No. 2013-152670, filed on Jul. 23, 2013, including the specification, drawings and abstract, is incorporated herein by reference in its entirety.

The invention claimed is:

1. A first radio base station that establishes radio synchronization by using a downlink signal transmitted from a second radio base station, the first radio base station comprising:
   a synchronization information control section that, via an inter-base station interface, reports a synchronization information request to the second radio base station and also acquires synchronization information reported from the second radio base station; and
   a determining section that determines whether to establish radio synchronization with the second radio base station or a third radio base station, based on the synchronization information acquired,
   wherein the synchronization information which the synchronization information control section acquires from the second radio base station includes a synchronization status, a synchronization stratum level, and information to represent a synchronization group, of the second radio base station, and
   wherein, when the synchronization information is received from a plurality of radio base stations including the second radio base station, the determining section prioritizes one of the synchronization stratum level and the information to represent the synchronization group when determining which radio base station in which to establish radio synchronization.

2. The first radio base station according to claim 1, wherein the information to represent the synchronization group is an ID that is assigned to each cell group comprised of mutually synchronized cells, or a cell ID of a cell having a highest synchronization stratum level in a cell group comprised of mutually synchronized cells.

3. The first radio base station according to claim 2, wherein the synchronization information control section holds the synchronization stratum level and the information to represent the synchronization group of the first radio base station based on the synchronization information reported from the second radio base station in order to establish radio synchronization.

4. The first radio base station according to claim 2, wherein:
   the synchronization information control section acquires information to represent a synchronization group to establish radio synchronization with, that is reported from a network serving the first radio base station; and
   the determining section determines a radio base station that is included in the reported synchronization group and that has a highest synchronization stratum level as the radio base station in which to establish radio synchronization.

5. The first radio base station according to claim 1, wherein the synchronization information control section holds the synchronization stratum level and the information to represent the synchronization group of the first radio base station based on the synchronization information reported from the second radio base station in order to establish radio synchronization.

6. The first radio base station according to claim 1, wherein:
   the synchronization information control section acquires information to represent a synchronization group to establish radio synchronization with, that is reported from a network serving the first radio base station; and
   the determining section determines a radio base station that is included in the reported synchronization group and that has a highest synchronization stratum level as the radio base station in which to establish radio synchronization.

7. A macro radio base station, under which a plurality of small radio base stations serve, that establishes radio synchronization by using downlink signals transmitted from a plurality of radio base stations including the small radio base stations, the macro radio base station comprising:
   a list generating section that generates a first list to define information related to the plurality of serving small radio base stations, and a second list to define information related to the synchronization of the small radio base stations; and
   a transmission section that reports the first list and the second list to a user terminal,
   wherein, when information related to the synchronization of the small radio base stations is received from more than one of the plurality of radio base stations, the determining section prioritizes one of the synchronization stratum level and the information to represent the synchronization group in order to determine which radio base station in which to establish radio synchronization.

8. The macro radio base station according to claim 7, further comprising a synchronization information control section that reports a synchronization information request to one of the plurality of radio base stations via an inter-base station interface and receives synchronization information from the one of the plurality radio base stations,
   wherein the list generating section generates the first list and the second list based on the synchronization information reported from the one of the plurality of radio base stations.

9. A user terminal that can receive downlink signals from a macro base station and a plurality of small radio base stations that serve under the macro base station, the user terminal comprising:
   a receiving section that receives a first list to define information related to the plurality of small radio base stations serving under the macro base station and a second list to define the small radio base stations that are synchronized with the macro base station; and
   a detection section that detects one of the plurality of the small radio base station to connect to by using the first list and the second list,
   wherein, when information related to the synchronization of the plurality of small radio base stations is received from more than one of a plurality of radio base stations, the determining section prioritizes one of a synchronization stratum level and the information to represent a synchronization group in order to determine which radio base station in which to establish radio synchronization.

10. The user terminal according to claim 8, wherein the detection section detects the small radio base station by using the second list preferentially, and, when no small radio base station is detected in a predetermined period, detects the small radio base station by using the first list.

* * * * *